United States Patent Office 3,455,951
Patented July 15, 1969

3,455,951
PREPARATION OF POLYCYCLIC
AROMATIC COMPOUNDS
Ernest Bryson McCall, Llangollen, and Terence James Rawlings, Johnstown, Wrexham, Wales, assignors to Monsanto Chemicals Limited, London, England, a British company
No Drawing. Filed Feb. 28, 1964, Ser. No. 348,265
Claims priority, application Great Britain, Mar. 4, 1963, 8,500/63
Int. Cl. C07d 67/00, 9/00; C07c 139/00
U.S. Cl. 260—329.3         7 Claims

ABSTRACT OF THE DISCLOSURE

This invention covers a process wherein aromatic sulfonyl halides containing at least two aromatic nuclei are heated to produce polycyclic aromatic compounds. This invention also covers certain of said polycyclic aromatic compounds as new compositions of matter.

This invention relates to a process for the production of aromatic compounds, in particular polycyclic aromatic compounds, and to certain polycyclic aromatic compounds that are new materials.

Such polycyclic aromatic compounds are valuable in a number of applications. For example, some have high thermal stabilities so that in appropriate instances they can be used as heat transfer fluids or high temperature lubricants. Some of the polycyclic aromatic compounds are useful as, for instance, dyestuffs, pharmaceuticals or fungicides, or as intermediates in the production of such materials.

Copending application Ser. No. 150,120, filed Nov. 6, 1961, now Patent No. 3,231,629, discloses a process for the arylation of an aromatic compound in which an aromatic group is introduced into the aromatic compound by heating the latter with an aromatic sulfonyl halide.

The process of the present invention is a modification of that referred to in the preceding paragraph, and can be regarded as one in which an aromatic sulfonyl halide undergoes intramolecular arylation.

The process of the present invention is one for the production of a polycyclic aromatic compound, in which a compound containing a first aromatic nucleus which carries (a) a sulfonyl halide group and (b) a second aromatic nucleus linked to the first aromatic nucleus in the ortho-position to the sulfonyl halide group is heated such that sulfur dioxide and a hydrogen halide are evolved, and a bond is formed between a carbon atom of the first aromatic nucleus and a carbon atom of the second aromatic nucleus.

In the sulfonyl halide that is the starting material in the process, the second aromatic nucleus can be linked to the first either directly or indirectly. Where the link is indirect, there can be one or more of a number of different atoms or groups interposed between the two aromatic nuclei. A typical instance of the process of the invention is the production of dibenzofuran from 2-phenoxybenzene sulfonyl chloride.

Preferred sulfonyl halides for use in the process are sulfonyl chlorides and sulfonyl bromides.

The invention includes certain new polycyclic aromatic compounds that can be produced by the process of the invention.

An aromatic nucleus in the sulfonyl halide starting material can be carbocyclic, for instance a benzene or naphthalene nucleus, or heterocyclic, for instance a pyridine, quinoline or thiophene nucleus. In preferred instances, an aromatic nucleus is carbocyclic.

Where the link between the first and second aromatic nuclei in the sulfonyl halide starting material is direct, the starting material can be, for example, a diphenyl-2-sulfonyl halide, or a dinaphthyl-2-sulfonyl halide giving as product a diphenylene or dinaphthylene, respectively.

Where the link is indirect, the second aromatic nucleus can be linked to the first through, for example, an oxygen or sulfur atom, an alkylene group such as a methylene group, through two carbon atoms (usually two adjacent carbon atoms) of a further aromatic nucleus, or through an appropriate combination of two or more such atoms or groups. An appropriate combination is, of course, one where the formation of a bond between carbon atoms of the first and second aromatic nuclei by the process of the invention is sterically feasible. In instances where notionally there is more than one way in which the bond might be formed, the structure actually produced is the one that is least strained.

Thus, for example, cyclization by the process of the invention of a 2-phenoxybenzenesulfonyl halide containing as aromatic nuclei only the phenyl group that is linked through the oxygen atom to the benzene nucleus, and the benzene nucleus itself, gives a dibenzofuran. An analogous 2-phenoxynaphthalene-1-sulfonyl halide gives a benzonaphthofuran; an analogous 2-phenylthiobenzenesulfonyl halide gives a dibenzothiophene; and an analogous 2-benzylbenzenesulfonyl halide gives a fluorene.

Where, however, the starting material is, for example, a 2 - (2' - phenylphenoxy)benzenesulfonyl halide, bond formation occurs between a carbon atom of the benzene nucleus and an ortho carbon atom of the phenyl group that is a substituent in the phenoxy group, and the product is a tribenzo(b,d,f)oxepin. Examples of other similar processes and products are given below with particular reference to the new compounds of the invention.

Any or all of the aromatic nuclei in the sulfonyl halide starting material can contain an inert substituent that is carried through to the product. However, in the 2-biphenylyl group, there must be at least one unsubstituted 2'-position. Such a substituent can be, for instance, a halogen atom; for example, a fluorine, chlorine or bromine atom; a hydroxyl group; a nitro group; a nitrile group; an aliphatic group, such as an alkyl group, for example, a methyl, ethyl or butyl group, a cycloalkyl group, for example, a cyclohexyl group, or an alkoxy group, for example, a methoxy or ethoxy group; an aromatic group, such as an aryl group, for example, a phenyl group; or an aliphatic group containing an aromatic group as a substituent, such as an aralkyl group, for example, a benzyl group, where, in each instance, the aromatic group is so disposed as not to be involved in the cyclization reaction. The preferred substituents on the aromatic nucleus are chlorine, bromine or lower alkyl.

The new compounds of the invention are those having the formula,

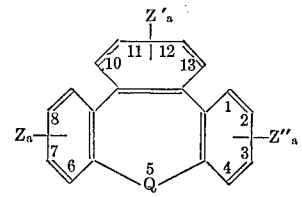

where Q represents an oxygen atom, a sulfur atom or a methylene group, Z, Z′ and Z″ each represent substituents, as exemplified in the preceding paragraph, and $a$ is an integer from zero to two. The formula also shows the system of numbering adopted to identify nuclear positions.

The compounds where Q represents an oxygen atom are tribenzo(b,d,f)oxepins; the compounds where Q represents a sulfur atom are tribenzo(d,b,f)thiepins; and those where Q represents a methylene groups are tribenzo (b,d,f)cyclohepta-2,4,6-trienes.

The corresponding starting materials for the production of the new compounds by the process of the invention are a 2-(2'-phenylphenoxy)benzenesulfonyl halide, a 2-(2'-biphenylthio)benzenesulfonyl halide and a 2-(2'-phenylbenzyl)benzenesulfonyl halide, respectively, the sulfonyl halide being, in each instance, appropriately substituted by atoms or groups Z, Z' or Z'' where such substituents are desired in the product.

The most readily accessible new compounds are, in general, the unsubstituted members of the class and substituted members where the substituents are chlorine, bromine or lower alkyl groups of up to 4 carbon atoms, and where Z, Z' and Z'' each represents not more than two such substituents.

Examples of such substituted compounds are 7,12-dichlorotribenzo(b,d,f)oxepin; 7,12-dichlorotribenzo(b,d,f) thiepin; 7,8 - dibromotribenzo(b,d,f)cyclohepta-2,4,6-triene; 2-methyltribenzo(b,d,f)oxepin; and 3-t-butyltribenzo (b,d,f)thiepin.

The process of the invention is normally carried out at a temperature higher than about 100° C., for example, at a temperature in the range of 100° C. to 400° C. Good results are obtained by heating the sulfonyl halide at a temperature in the range of 200° C. to 300° C., for instnace, at 250° C. or 275° C. The reaction can be carried out in the liquid or vapor phase. In the former, the liquid phase can be the molten sulfonyl halide itself or, for instance, a solution of the sulfonyl halide in an organic solvent that is inert to aryl free radicals and has a suitably high boiling point, e.g., hexachlorobenzene or octachloronaphthalene).

Often the rate of reaction is increased by the presence of a catalyst, for example, one of the materials disclosed in copending application Ser. No. 226,433, filed Sept. 26, 1962, now Patent No. 3,244,721. Copper and its compounds, for example, copper halides, are often among the most effective catalysts.

The invention is illustrated by the following examples.

Example 1

This example describes the production of dibenzothiophene from 2-phenylthiobenzenesulfonyl chloride.

A partial solution of 5 grams of 2-phenylthiobenzenesulfonyl chloride in 15 grams of octachloronaphthalene was heated at 250° C. with stirring while a slow stream of nitrogen was passed through the mixture. Hydrogen chloride and sulfur dioxide were evolved. Heating was continued for 5½ hours, when the amount of hydrogen chloride that had been produced was equivalent to 92.5% of the original sulfonyl halide, and the amount of sulfur dioxide was equivalent to 80% of the original sulfonyl halide. The infrared spectrum of the reaction mixture indicated a yield of dibenzothiophene of 47% of the theoretical. One and one-half grams of slightly impure dibenzothiophene were isolated by distillation of the reaction mixture under reduced pressure.

Example 2

This example describes the production of dibenzofuran from 2-phenoxybenzenesulfonyl chloride.

Under reaction conditions essentially the same as in the process of Example 1, a 17% yield of dibenzofuran was obtained from 5 grams of 2-phenoxybenzenesulfonyl chloride in 15 grams of octachloronaphthalene.

Example 3

This example describes the production of the new compounds, tribenzo(b,d,f)oxepin.

A suspension of 8 grams of 2-(2'-phenylphenoxy) benzenesulfonyl chloride in 24 grams of octachloronaphthalene was heated with stirring at 250° C. for 5 hours. A stream of nitrogen passed through the suspension carried away the sulfur dioxide and hydrogen chloride produced during the reaction. At the end of the 5-hour heating period, 60% of the theoretical amount of sulfur dioxide and 90 of the theoretical amount of hydrogen chloride had been evolved.

Octachloronaphthalene was distilled from the reaction mixture under reduced pressure. Infrared analysis of the distillation residue showed it to contain about 4.4 grams of tribenzo(b,d,f)oxepin. One and two-tenths grams of the pure compound, a crystalline material having a melting point of 116–117° C., were isolated by several recrystallizations of the distillation residue from ethanol. (Found: C, 88.41; H, 5.12%; $C_{18}H_{12}O$ requires: C, 88.50; H, 4.95%.)

Example 4

This example describes the production of dibenzofuran by the thermal decomposition of molten 2-phenoxybenzenesulfonyl chloride in the presence of a catalyst.

A mixture of 5.3 grams of 2-phenoxybenzenesulfonyl chloride and 0.02 gram of cuprous chloride was stirred and heated at 250–260° C. in an atmosphere of nitrogen for 1½ hours. At the end of this time, 79% of the theoretical amount of hydrogen chloride and 96% of the theoretical amount of sulfur dioxide had evolved.

Distillation of the reaction mixture under reduced pressure gave 1.5 grams of a fraction having a boiling range of 75° C. to 77° C. at a pressure of 0.1 mm. of mercury. Vapor phase chromatography of this fraction showed that it contained 53% by weight of dibenzofuran, corresponding to a yield of 24% of 2-phenoxybenzenesulfonyl chloride.

Example 5

This example describes the production of tribenzo(b, d,f)oxepin by the thermal decomposition of molten 2-(2'-phenylphenoxy)benzenesulfonyl chloride in the presence of a catalyst.

A mixture of 5.4 grams of 2-(2'-phenylphenoxy)benzenesulfonyl chloride and 0.016 gram of cuprous chloride was stirred and heated at 250–260° C. in an atmosphere of nitrogen for 2 hours. At the end of this time, 92% of the theoretical amount of hydrogen chloride and 90% of the theoretical amount of sulfur dioxide had been evolved.

Distillation of the reaction mixture under reduced pressure gave 2.6 grams of a fraction having a boiling point of 146–147° C. at a pressure of 0.1 mm. of mercury. This distillate solidified on standing and was crystallized from ethanol to give 1.7 grams (45% yield) of tribenzo-(b,d,f)oxepin having a melting point of 116–117° C.

Example 6

This example describes the production of the new compound, tribenzo(b,d,f)thiepin, by the thermal cyclization of 2-(2'-biphenylylthio)benzenesulfonyl chloride.

2-(2' - biphenylylthio)benzenesulfonyl chloride was synthesized from o-phenylthiophenol via 2-nitro-2'-phenyl diphenyl sulfide and 2-amino-2'-phenyl diphenyl sulfide as follows:

A solution of sodium ethoxide, prepared by dissolving 1.82 grams of sodium in ethanol, was added to an ethanolic solution of o-phenylthiophenol (prepared by the method of Bourgeois, Ber., 28, 2319 (1895)), and the mixture was evaporated to dryness. The residue (sodium o-phenylthiophenate) was dissolved in 25 cc. of water, and the solution this obtained was added slowly to a stirred solution of 12.5 grams of o-chloronitrobenzene in 50 cc. of dimethylformamide. When the addition was complete, the mixture was heated, with stirring, for 2 hours on a steam bath. After cooling, the mixture was poured into water and extracted with ether. The ether extracts were washed successively with water, dilute sodium hydroxide solution and water, and were then dried by standing over anhydrous sodium sulfate. After filtering, the ether was evaporated, leaving a viscous brown oil which was distilled under reduced pressure to give 21.9 grams (90% yield) of 2-nitro-2′-phenyl diphenyl sulfide as a fraction having a boiling range of 190–192° C. at a pressure of 0.2 mm. of mercury.

A suspension of 21.9 grams of 2-nitro-2′-phenyl diphenyl sulfide and 44.5 grams of iron powder in 325 cc. of water containing 0.34 cc. of glacial acetic acid was stirred and heated on a steam bath for 16 hours. The mixture was allowed to cool. It was then made alkaline with sodium carbonate and filtered. The filtrate was extracted with benzene. The solid removed by filtration was washed four times with hot benzene, and the washings were added to the benzene extract of the filtrate. The combined benzene solution was distilled to remove the solvent, and the residue was further distilled under reduced pressure to give 14.8 grams (75% yield) of 2-amino-2′-phenyl diphenyl sulfide as a fraction having a boiling range of 196–198° C. at a pressure of 0.5 mm. of mercury.

A cold solution of 4.3 grams of sodium nitrite in 8 cc. of water was added slowly to a vigorously stirred solution of 14.8 grams of 2-amino-2′-phenyl diphenyl sulfide in 36.5 cc. of glacial acetic acid and 11.8 cc. of concentrated hydrochloric acid, keeping the temperature in the range of 0° C. to 5° C. The diazonium salt solution thus obtained was poured into a suspension of 2.63 grams of cupric chloride in 32.3 cc. of a 30% by weight solution of sulfur dioxide in glacial acetic acid. The mixture was heated at 40° C. for 3 hours and was then poured into 1 liter of water. The oil which separated was extracted with ether, and the ether extracts were washed and dried over anhydrous sodium sulfate. After filtering, the ether was evaporated from the filtrate under reduced pressure so that the temperature of the residue did not exceed 40° C. The residual brown oil was extracted at room temperature with 40–60° petroleum ether giving an insoluble portion which solidified on standing. The solid, which weighed 6.2 grams (32% yield), was slightly impure 2-(2′-biphenylylthio)benzenesulfonyl chloride having a melting point of 77.5–79° C. Its melting point was raised to 78.5–79.5° C., and colored impurities were removed by treating a hot solution of the impure material in 60–80° petroleum ether with decolorizing charcoal, filtering and allowing the solute to crystallize from the filtrate. (Found: C, 60.54; H, 3.54; Cl, 9.89; S, 17.90%. $C_{18}H_{13}ClO_2S_2$ requires: C, 59.91; H, 3.63; Cl, 9.83; S, 17.71%.)

For the production of tribenzo(b,d,f)thiepin, a suspension of 0.027 gram of cuprous chloride in 10 grams of molten 2-(2′-biphenylylthio)benzenesulfonyl chloride was stirred and heated for 2 hours at 260° C. in an atmosphere of nitrogen. Ninety-four percent of the theoretical amount of hydrogen chloride and 80% of the theoretical amount of sulfur dioxide were evolved. The product was distilled under reduced pressure to give 5.2 grams of a yellow oil having a boiling range of 163–166° C. at a pressure of 0.05 mm. of mercury. Recrystallization from ethanol to a constant melting point of 116–117° C. gave 1.7 grams of tribenzo(b,d,f)thiepin in the form of colorless needles. (Found: C, 82.7; H, 4.4; S, 12.9%. $C_{18}H_{12}S$ requires: C, 83.1; H, 4.6; S, 12.3%.)

The structure of tribenzo(b,d,f)thiepin was confirmed by desulfurization with Raney nickel to o-terphenyl.

Following the procedures detailed in the preceding examples, other and different starting materials of this invention are heated to yield the products hereinafter indicated.

Example 7

Starting material: 2-(p-nitrophenylthio)benzenesulfonyl bromide
Product: 2-nitrodibenzothiophene.

Example 8

Starting material: 2-benzylbenzenesulfonyl chloride
Product: Fluorine.

Example 9

Starting material: 2-phenoxy-4-ethylbenzenesulfonyl chloride
Product: 2-ethyldibenzofuran.

Example 10

Starting material: 2-(m-chlorophenylthio)naphthalene-1-sulfonyl chloride
Product: 3-chlorobenzonaphthothiophene.

Example 11

Starting material: 2-[2′-(3,4-dichlorophenyl)phenoxy]benzenesulfonyl chloride
Product: 11,12-dichlorotribenzo(b,d,f)oxepin.

Example 12

Starting material: 2-(2′-phenylbenzyl)-4-nitrobenzenesulfonyl chloride
Product: 3-nitrotribenzo(b,d,f)cyclohepta-2,4,6-triene.

While the invention has been described with respect to certain specific embodiments, it is not so limited. It is to be understood that variations and modifications thereof may be made by those skilled in the art without departing from the spirit and scope of the invention.

What is claimed is:
1. A process which comprises heating, at a temperature of from about 100° C. to about 400° C., a compound of the formula,

$$R'—(Y)_n—R—SO_2X$$

wherein:
X is selected from the group consisting of chlorine and bromine;
Y is selected from the group consisting of oxygen, sulfur and —$CH_2$—;
n is an integer from zero to one;
R is selected from the group consisting of phenylene and the substituted derivatives of phenylene in which the substituents are selected from the group consisting of chlorine, bromine, nitro and lower alkyl;
R′ is selected from the group consisting of phenyl and the substituted derivatives of phenyl in which the substituents are selected from the group consisting of chlorine, bromine, nitro and lower alkyl, there being at least one unsubstituted carbon atom ortho to the carbon atom linked to —$(Y)_n$—R—$SO_2X$; and
R′—$(Y)_n$— being linked to R at a carbon atom ortho to the carbon atom containing the —$SO_2X$ group.

2. A process as defined in claim 1 wherein the temperature is from about 200° C. to about 300° C.

3. A process as defined in claim 1 wherein said compound is heated in the presence of a copper catalyst.

4. A process as defined in claim 1 wherein X is chlorine, Y is sulfur, n is one, R is phenylene and R′ is phenyl.

5. A process as defined in claim 1 wherein X is chlorine, Y is oxygen, n is one, R is phenylene and R′ is phenyl.

6. A process as defined in claim 1 wherein X is chlorine, n is zero, R is phenylene and R′ is phenyl.

7. A process as defined in claim 1 wherein X is chlorine, Y is —$CH_2$—, n is one, R is phenylene and R′ is phenyl.

References Cited

UNITED STATES PATENTS 3,231,629  1/1966  McCall et al. _____ 260—670
3,244,721  4/1966  Bain et al. _____ 260—670

JAMES A. PATTEN, Primary Examiner

U.S. Cl. X.R.

260—141, 142, 283, 290, 327, 333, 346.2, 645, 646, 649, 543, 668